(12) United States Patent
Chen et al.

(10) Patent No.: US 9,948,055 B2
(45) Date of Patent: Apr. 17, 2018

(54) GAS LASER

(71) Applicant: Huazhong University of Science and Technology, Wuhan (CN)

(72) Inventors: Hanyuan Chen, Wuhan (CN); Yingxiong Qin, Wuhan (CN); Hao Peng, Wuhan (CN); Chenhao Wan, Wuhan (CN); Sichen Long, Wuhan (CN); Xiangxi Wu, Wuhan (CN); Xiahui Tang, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 0 days.

(21) Appl. No.: 15/493,106

(22) Filed: Apr. 20, 2017

(65) Prior Publication Data

US 2017/0222389 A1     Aug. 3, 2017

Related U.S. Application Data

(63) Continuation-in-part of application No. PCT/CN2016/077104, filed on Mar. 23, 2016.

(30) Foreign Application Priority Data

Nov. 6, 2015   (CN) .......................... 2015 1 0755529

(51) Int. Cl.
*H01S 3/04*     (2006.01)
*H01S 3/032*    (2006.01)
(Continued)

(52) U.S. Cl.
CPC ............. *H01S 3/0323* (2013.01); *H01S 3/034* (2013.01); *H01S 3/036* (2013.01); *H01S 3/038* (2013.01);
(Continued)

(58) Field of Classification Search
CPC ...... H01S 3/0323; H01S 3/2207; H01S 3/036; H01S 3/0405; H01S 3/0404; H01S 3/034;
(Continued)

(56) References Cited

U.S. PATENT DOCUMENTS

| 6,603,792 B1 * | 8/2003 | Chomsky ............ H01S 3/08081 372/55 |
| 7,932,673 B2 * | 4/2011 | Schleimann-Jensen .. H01T 4/12 313/567 |

(Continued)

*Primary Examiner* — Vu A Vu
(74) *Attorney, Agent, or Firm* — Matthias Scholl, PC; Matthias Scholl

(57) ABSTRACT

A gas laser, including: a semiconductor laser, an optical beam-shaping system, a pair of electrodes, a discharge tube, a rear mirror, and an output mirror. The pair of electrodes includes two electrodes. The electrodes are symmetrically disposed at an outer layer of the discharge tube in parallel. The electrodes are connected to a radio-frequency power supply via a matching network, and the electrodes operate to modify working gas in the discharge tube through radio-frequency discharge. The rear mirror and the output mirror are disposed at two end surfaces of the discharge tube, respectively. The rear mirror, taken together with the output mirror and the discharge tube, form a resonant cavity. The output mirror is configured to output a laser beam.

13 Claims, 4 Drawing Sheets

(51) Int. Cl.
   *H01S 3/038*      (2006.01)
   *H01S 3/0943*     (2006.01)
   *H01S 3/0941*     (2006.01)
   *H01S 3/036*      (2006.01)
   *H01S 3/034*      (2006.01)
   *H01S 3/22*       (2006.01)

(52) U.S. Cl.
   CPC .......... *H01S 3/0388* (2013.01); *H01S 3/0404* (2013.01); *H01S 3/0405* (2013.01); *H01S 3/0407* (2013.01); *H01S 3/0943* (2013.01); *H01S 3/09415* (2013.01); *H01S 3/2207* (2013.01)

(58) Field of Classification Search
   CPC .. H01S 3/0388; H01S 3/09415; H01S 3/0943; H01S 3/038; H01S 3/0407
   USPC .......................................................... 372/35
   See application file for complete search history.

(56) References Cited

U.S. PATENT DOCUMENTS

| | | | |
|---|---|---|---|
| 9,001,850 B2 * | 4/2015 | Berger | H01S 3/06704 372/6 |
| 2009/0022201 A1 * | 1/2009 | Krupke | H01S 3/031 372/75 |

* cited by examiner

GAS LASER

CROSS-REFERENCE TO RELATED APPLICATIONS

This application is a continuation-in-part of International Patent Application No. PCT/CN2016/077104 with an international filing date of Mar. 23, 2016, designating the United States, now pending, and further claims foreign priority benefits to Chinese Patent Application No. 201510755529.9 filed Nov. 6, 2015. The contents of all of the aforementioned applications, including any intervening amendments thereto, are incorporated herein by reference.

BACKGROUND OF THE INVENTION

Field of the Invention

The invention relates to a gas laser.

Description of the Related Art

Conventional lasers have the following disadvantages:

1. Conventional high-power lasers are bulky and inefficient in converting electricity into pump light. The output power of the lasers is adversely limited by the non-liner effect.

2. Existing gas lasers have low output power. The working substance is in solid state, and requires to be heated to change into gas state, which produces unwanted waste heat and brings difficulty in controlling the temperature of the alkali steam pool. In addition, in the process of generating laser, the working substance tends to contaminate the laser output window and produces harmful substances.

SUMMARY OF THE INVENTION

In view of the above-described problems, it is one objective of the invention to provide a gas laser. The gas laser features high quantum efficiency, high laser beam quality, favorable optical fiber transmission characteristics, and ultrahigh output power.

To achieve the above objective, in accordance with one embodiment of the invention, there is provided a gas laser, comprising a semiconductor laser, an optical beam-shaping system, a pair of electrodes, a discharge tube, a rear mirror, and an output mirror.

The pair of electrodes comprises two electrodes. The electrodes are symmetrically disposed at an outer layer of the discharge tube in parallel. The electrodes are connected to a radio-frequency power supply via a matching network, and the electrodes operate to modify working gas in the discharge tube through radio-frequency discharge.

The rear mirror and the output mirror are disposed at two end surfaces of the discharge tube, respectively. The rear mirror, the output mirror, and the discharge tube form a resonant cavity. The output mirror is configured to output a laser beam.

In a class of this embodiment, an outer wall of the discharge tube in the vicinity of the optical beam-shaping system (which means an incident plane of pump light) is coated with a high-transmission film. The high-transmission film is conformity to pump light in size and shape. The rest of the outer wall is coated with a reflection film for the pump light wavelength. An inner wall of the discharge tube is uncoated or is coated with another high-transmission film for the pump light wavelength. The discharge tube is filled with the working gas. The working gas is rare gas or a mixture of rare gas and other assistant gas.

In a class of this embodiment, the semiconductor laser is configured to produce pump light. The pump light is concentrated by the optical beam-shaping system to form a narrow strip facula. The facula is allowed to pass through the high-transmission film on the outer wall of the discharge tube and is injected in the discharge tube. A central wavelength of the pump light matches with an absorption line of gas particles produced by the radio-frequency discharge of the working gas in the discharge tube.

In a class of this embodiment, the working gas in the discharge tube of the gas laser is a mixture of argon and helium, and a pressure thereof is between 0.5 and 2.0 atmosphere. A volume ratio of the argon to the helium is between 1:50 to 1:4.

In a class of this embodiment, the working gas in the discharge tube of the gas laser is neon, argon, krypton, xenon, a mixture of the neon and the helium, a mixture of the argon and the helium, a mixture of the krypton and the helium, a mixture of the xenon and helium, or a mixture of the neon, the argon, the krypton, the xenon, the helium, and other assistant gas.

In a class of this embodiment, the pair of electrodes of the gas laser is aluminum or copper. Contact surfaces of the pair of electrodes and the discharge tube are flat surfaces, or curved surfaces which match with the outer wall of the discharge tube, thus ensuring a uniform discharge.

In a class of this embodiment, a water-cooling channel is disposed in the pair of electrodes. The water-cooling channel is configured to reduce deformation of the pair of electrodes caused by temperature rise.

In a class of this embodiment, a shielding chamber of the gas laser is disposed at an outer side of the pair of electrodes. The shielding chamber is made of metal materials. The shielding chamber is filled with gas with high ionization potential, or the shielding chamber is vacuumed, so as to avoid working gas breakdown at the breakdown threshold in the discharge tube. The shielding chamber is provided with a shielding chamber window at a position relative to the semiconductor laser, enabling the pump light to transmit.

In a class of this embodiment, a gas inlet and a gas outlet are disposed in the discharge tube of the gas laser. An external pipeline between the gas inlet and the gas outlet is connected to a fan and a heat exchanger in series, thus a circulation of the working gas is built, and a heat dissipation effect is enhanced.

In a class of this embodiment, a plurality of discharge tubes is connected in series in the shielding chamber of the gas laser. Pairs of the electrodes on the outer wall of adjacent discharge tubes are mutually perpendicular, thus further increasing the output power of the gas laser.

In a class of this embodiment, the discharge tube of the gas laser is cylindrical, and the discharge effect is improved.

The laser of the invention has the advantages of gas laser and solid-state laser, effectively eliminating the non-liner effect of solid-state gain medium at high power, and achieves high power, high laser beam quality, and short wavelength laser output. The gas laser featuring a novel structure effectively avoids non-liner effect of high-power continuous single-mode laser and high-power picosecond femtosecond laser, and has advantages as high power output, high pulse energy, favorable laser beam quality, high quantum efficiency, favorable laser propagation and optical fiber transmission characteristics, and high processing efficiency, thus the gas laser is an important potential light source in the future in the fields including high energy laser weapon, space energy transmission, remote laser processing, large-scale industrial application of ultra-short pulse laser, etc. The gas laser is different from a conventional laser, because of the two-stage pumping process of the gas laser. The two-stage pumping process comprises a radio-frequency discharge process and a collision process of the pump light and the gas particles which experienced the radio-frequency discharge in the discharge tube. The two-stage pumping process can improve discharge stability, pumping efficiency, and conversion efficiency, thus the output power is improved. Advantages of the gas laser according to embodiments of the invention are summarized as follows:

1. The working gas is single rare gas, a mixture of two rare gases, or a mixture of rare gases and other assistant gas, thus the working gas is poisonless, harmless, and stable in chemical characteristic. At normal temperature, the working gas is in gas state, thus the circulation of working gas can be built, and strong support is provided for the high-power laser output. During the laser output process, no harmful substance which does harm to the human body and the environment is produced. When the working gas is a mixture of argon and helium, meanwhile a pressure thereof is between 0.5 and 2.0 atmosphere, and a volume ratio of the argon to the helium is between 1:50 to 1:4, the conversion rate from electricity to pump light is high, and the absorption of the pump light is favorable, thus improving the pump efficiency, and further improving the laser output power.

2. Coating technique is applied on the discharge tube which is used in the radio-frequency discharge process, thus air tightness and high reflection of pump light are ensured at the same time, and a multi-pass reflection process of the pump light which is similar to the blackbody absorption in the discharge tube is realized. A collision probability of the pump light and the gas particles in the discharge tube is increased, and pump efficiency of the gas laser is improved, in addition, the output power of the laser is increased.

3. The pair of electrodes which is used during the radio-frequency discharge process is made of common metal such as aluminum or copper, thus is easy and cheap to process. The water-cooling channel is disposed in the pair of electrodes. The water-cooling channel is configured to take away unwanted heat, and reduce deformation of the pair of electrodes, thus ensuring the stability of the laser and the ultrahigh output power of the laser.

4. The pump light is concentrated by the optical beam-shaping system to form a narrow strip facula, and is injected into the discharge tube, therefore, the pump intensity and uniformity are improved, and a collision probability of the pump light and the gas particles in the discharge tube is increased, furthering enhancing the pump quality and pump efficiency of the pump light.

5. The output power of the laser is increased by increasing the pressure of the working gas. Under high pressure (between 0.5 and 2.0 atmosphere), the discharge tube and the pair of electrodes are sealed in an air-tight shielding chamber, and the shielding chamber is filled with gas with high ionization potential, or the shielding chamber is vacuumed, so as to avoid breakdown of the gas outside of the discharge tube due to high discharge voltage, thus ensuring the discharge voltage is fully and effectively used during the discharge process of the working gas, improving the stability and uniformity of the gas discharge, and facilitating the high power output of the laser.

6. Based on the existing fast axial flow technology, a gas inlet and a gas outlet are disposed in the discharge tube; an external pipeline between the gas inlet and the gas outlet is connected to a fan and a heat exchanger in series, thus a circulation of the working gas is built, and unwanted heat is taken away, in addition the output power of the laser is increased.

7. A plurality of discharge tubes is connected in series in the shielding chamber of the gas laser, and pairs of the electrodes are staggered, thus the discharge uniformity is improved, and the output power of the gas laser is further increased.

BRIEF DESCRIPTION OF THE DRAWINGS

The invention is described hereinbelow with reference to the accompanying drawings, in which.

Figure 1:
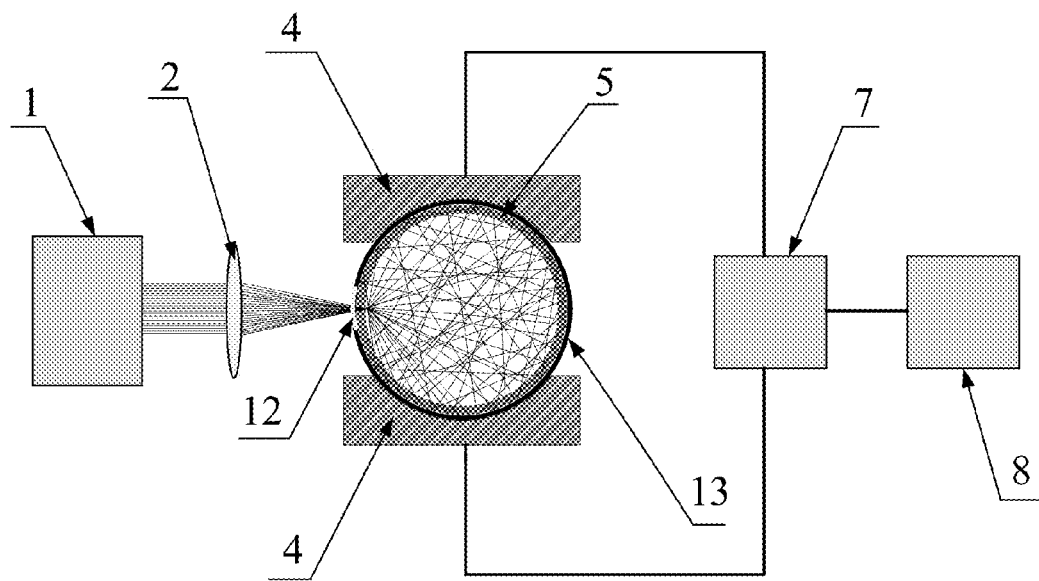
FIG. 1 is an end face diagram of a gas laser in accordance with one embodiment of the invention.

In the drawings, the following reference numbers are used: 1. Semiconductor laser; 2. Optical beam-shaping system; 3. Shielding chamber window; 4. Pair of electrodes; 5. Discharge tube; 6. Shielding chamber; 7. Matching network; 8. Radio-frequency power supply; 9. Rear mirror; 10. Output mirror; 11. Output laser; 12. High-transmission film; 13. High-reflection film; 14. Gas inlet; 15. Gas outlet; 16. Fan; and 17. Heat exchanger.

DETAILED DESCRIPTION OF THE EMBODIMENTS

For further illustrating the invention, experiments detailing a gas laser are described below. It should be noted that the following examples are intended to describe and not to limit the invention.

Figure 2:
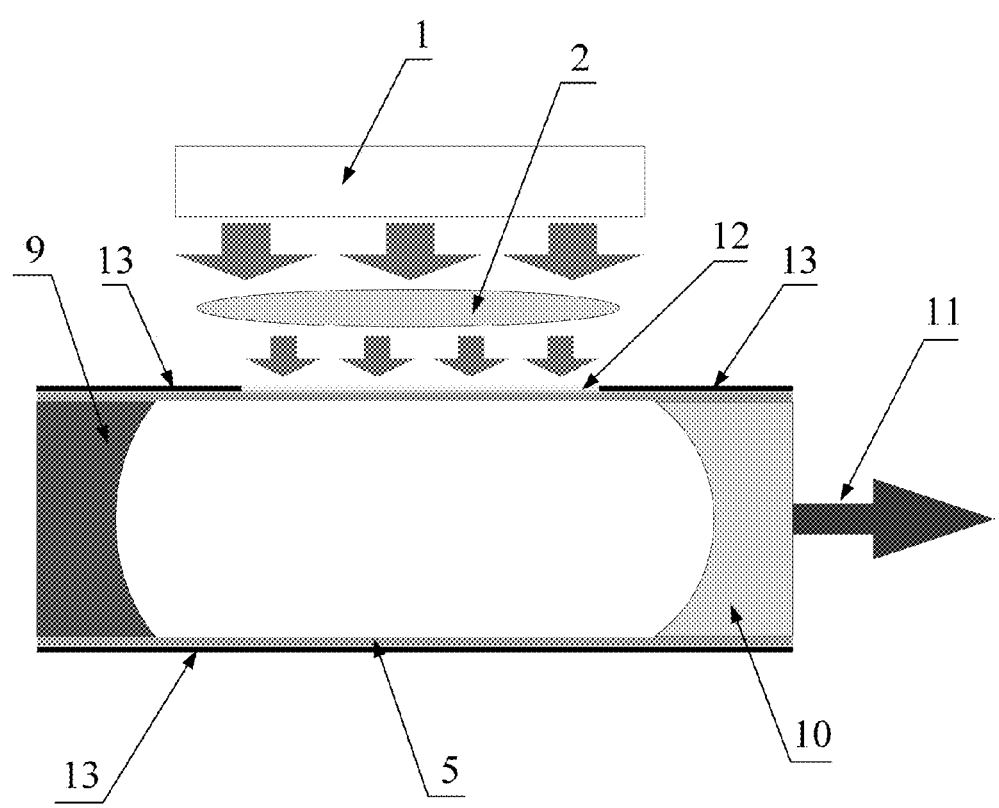
FIG. 2 is a semi-sectional view of a gas laser in accordance with one embodiment of the invention.
Figure 3:
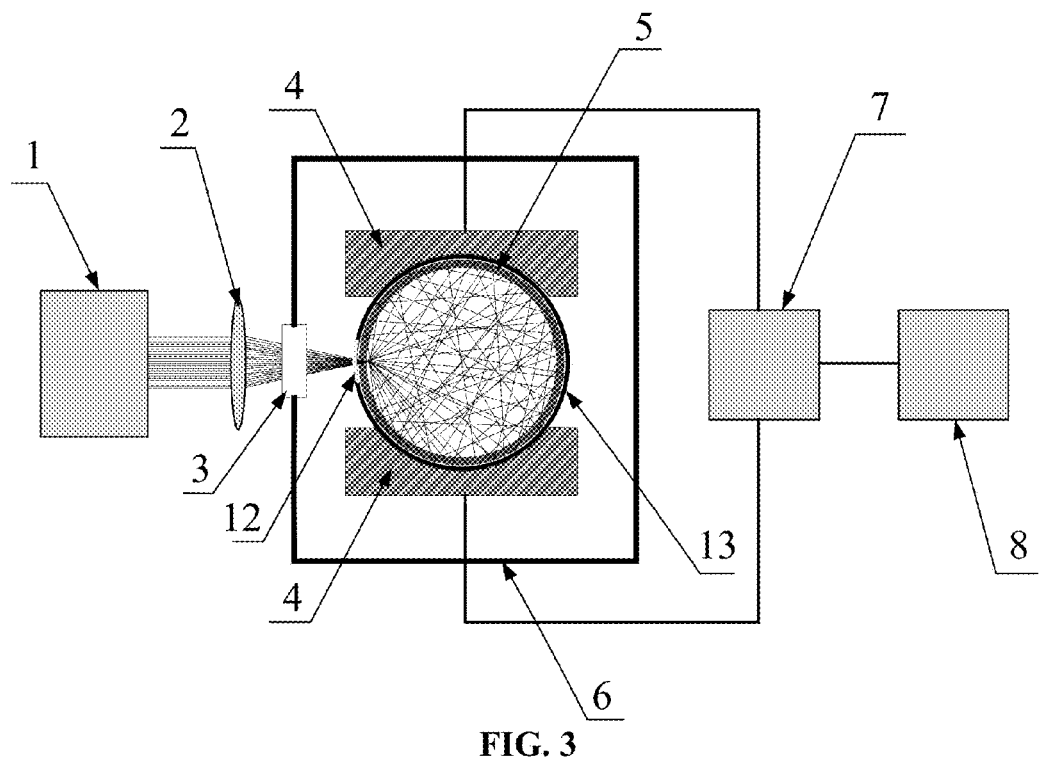
FIG. 3 is a schematic diagram of a shielding chamber of a gas laser in accordance with one embodiment of the invention.
Figure 4A:
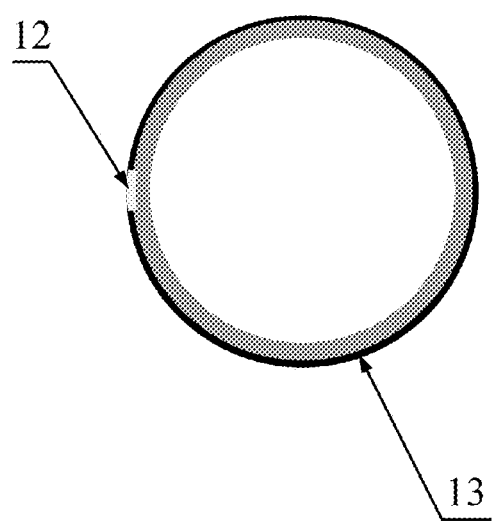
FIGS. 4A and 4B are schematic diagrams of a discharge tube of a gas laser in accordance with one embodiment of the invention.
Figure 4B:
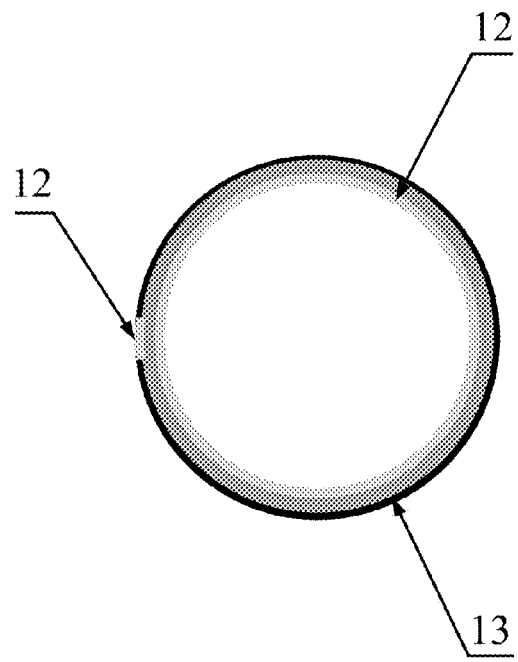
Figure 5:
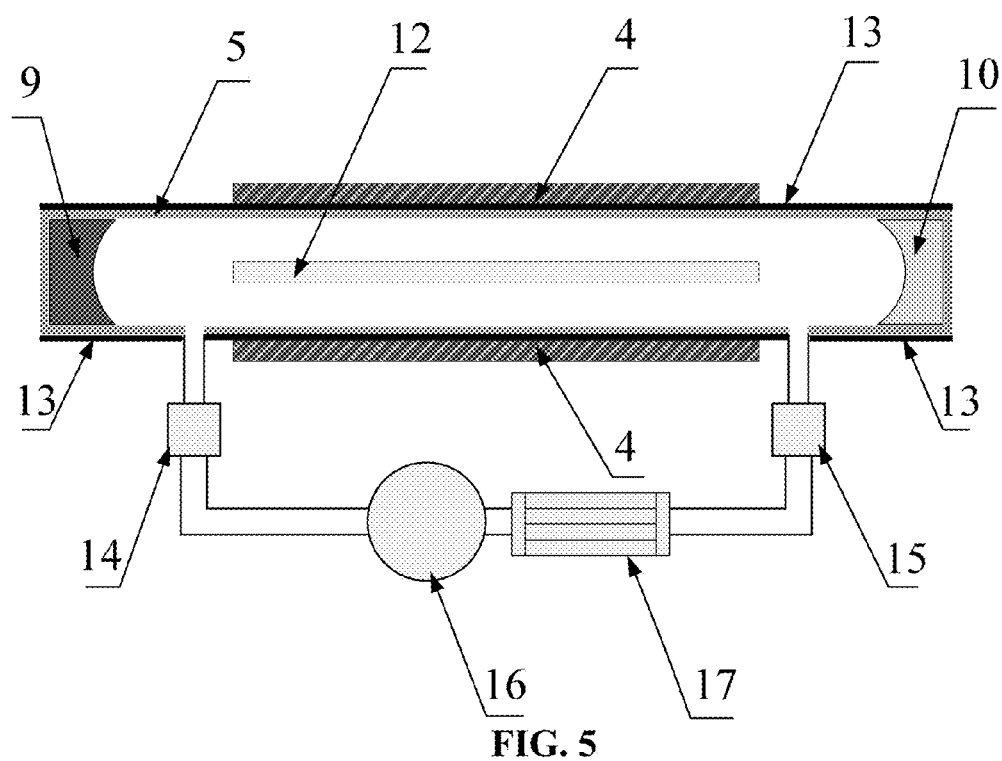
FIG. 5 is a schematic diagram showing a gas circulation in a gas laser in accordance with one embodiment of the invention.
Figure 6:
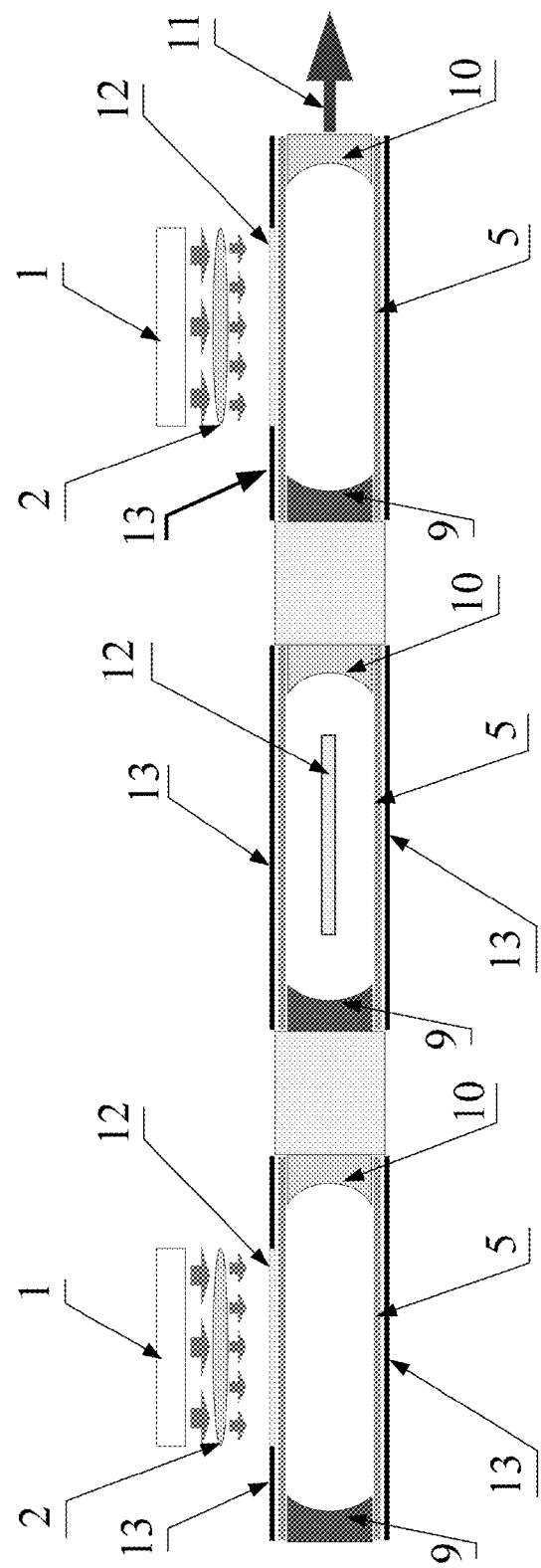
FIG. 6 is a diagram showing that a plurality of discharge tubes is connected in series in a gas laser in accordance with one embodiment of the invention.

The working mode of the gas laser is as follows:

As shown in FIGS. 1-5, in the example, a gas laser comprises a semiconductor laser 1 as a pumping source, an optical beam-shaping system 2, a pair of electrodes 4, a discharge tube 5 which is coated with a high-transmission film 12 and a high-reflection film 13, a shielding chamber 6, a rear mirror 9, an output mirror 10, a gas inlet 14, a gas outlet 15, a fan 16, a heat exchanger 17, a matching network 7, and a radio-frequency power supply 8 which is connected to the pair of electrodes 4 via the matching network 7. Coating technique is applied on the discharge tube 5, so that the pump light is fully injected into the discharge tube 5, and the discharge tube 5 features high-reflection characteristics for the pump light. A part of an outer surface of the discharge tube 5 is coated with the high-transmission film 12, and the pump light is fully injected in the discharge tube 5. The rest of the outer surface of the discharge tube is coated with the high-reflection film 13, and an inner wall of the discharge tube 5 is uncoated, or coated with another high-transmission film 12, thus the discharge tube 5 features high-reflection characteristics for the pump light, and a multi-pass reflection process of the pump light which is similar to the blackbody absorption in the discharge tube is realized. A collision probability of the pump light and the gas particles which experienced radio-frequency discharge in the discharge tube 5 is increased, and a pump efficiency and a pump quality of the gas laser is improved, in addition, the output power of the laser is increased. The working gas in the discharge tube 5 is single rare gas, a mixture of two rare gases, or a mixture of rare gases and other assistant gas, thus the working gas is poisonless, harmless, and stable in chemical characteristic. The water-cooling channel is disposed in the pair of electrodes 4. The water-cooling channel is configured to cool the pair of electrodes 4 during the high-power laser output process, and reduce deformation of the pair of electrodes, thus ensuring the stability of the radio-frequency discharge. The pump light is concentrated by the optical beam-shaping system 2 to form a narrow strip facula, and is fully injected into the discharge tube 5, therefore, the pump efficiency of the laser system is improved. The shielding chamber 6 is an air-tight chamber, and the discharge tube and the pair of electrodes are sealed in the air-tight shielding chamber. The shielding chamber is filled with gas with high ionization potential, or the shielding chamber is vacuumed, so as to avoid breakdown of the gas outside of the discharge tube due to high discharge voltage, thus improving the stability and uniformity of the radio-frequency discharge during the high-power laser output, and preventing pollution to the environment caused by radio-frequency radiation. The rear mirror 9 and the output mirror 10 are disposed at two ends of the discharge tube 5, respectively. The rear mirror and the output mirror form a resonant cavity. A gas inlet 14 and a gas outlet 15 are disposed in the discharge tube 5, and an external pipeline between the gas inlet and the gas outlet is connected to a fan 16 and a heat exchanger 17 in series, thus a circulation of the working gas is built in the discharge tube 5, and unwanted heat is reduced during the laser output process, in addition, the stability of the laser is ensured, and the output power of the laser is enhanced.

In conclusion, a gas laser which effectively outputs ultra-high power laser that features high laser beam quality is provided in the embodiment of the invention.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A gas laser, comprising:
a semiconductor laser;
an optical beam-shaping system;
a pair of electrodes comprising two electrodes;
a discharge tube;
a rear mirror; and
an output mirror;
wherein:
the two electrodes are symmetrically disposed in parallel at an outer layer of the discharge tube; the two electrodes are connected to a radio-frequency power supply via a matching network, and are configured to perform radio-frequency discharge on working gas in the discharge tube;
the rear mirror and the output mirror are disposed at two end surfaces of the discharge tube, respectively; the rear mirror, the output mirror, and the discharge tube form a resonant cavity; the output mirror is configured to output a laser beam;
an outer wall of the discharge tube in the vicinity of the optical beam-shaping system is coated with a transmission film; the transmission film is conformity to pump light in size and shape; the rest of the outer wall is coated with a reflection film, and an inner wall of the discharge tube is uncoated, or coated with another transmission film; the discharge tube is filled with the working gas; and the working gas is rare gas, or a mixture of rare gas and assistant gas;
the semiconductor laser is configured to produce pump light the optical beam-shaping system is configured to concentrate the pump light to form a narrow strip facula; the facula is allowed to pass through the transmission film on the outer wall of the discharge tube and is injected in the discharge tube; and a central wavelength of the pump light matches with an absorption line of gas particles produced by the radio-frequency discharge of the working gas in the discharge tube; and
the working gas in the discharge tube is a mixture of argon and helium, and a pressure thereof is between 0.5 and 2.0 atmosphere; a volume ratio of the argon to the helium is between 1:50 to 1:4.

2. The laser of claim 1, wherein the pair of electrodes is aluminum or copper; and contact surfaces of the pair of electrodes and the discharge tube are flat surfaces, or curved surfaces which match with the outer wall of the discharge tube.

3. The laser of claim 1, wherein a water-cooling channel is disposed in the pair of electrodes.

4. The laser of claim 1, wherein a shielding chamber is disposed at an outer side of the pair of electrodes; the shielding chamber is made of metal materials; the shielding chamber is filled with gas with ionization potential, or the shielding chamber is vacuumed; and the shielding chamber is provided with a shielding chamber window at a position relative to the semiconductor laser, and the shielding chamber window allows the pump light to transmit.

5. The laser of claim 1, wherein a gas inlet and a gas outlet are disposed in the discharge tube; and an external pipeline between the gas inlet and the gas outlet is connected to a fan and a heat exchanger in series.

6. The laser of claim 4, wherein a gas inlet and a gas outlet are disposed in the discharge tube; and an external pipeline between the gas inlet and the gas outlet is connected to a fan and a heat exchanger in series.

7. The laser of claim 4, wherein a plurality of the discharge tubes is connected in series in the shielding chamber; and pairs of the electrodes on the outer wall of adjacent discharge tubes are mutually perpendicular.

8. The laser of claim 1, wherein the discharge tube is cylindrical.

9. A gas laser, comprising:
a semiconductor laser;
an optical beam-shaping system;
a pair of electrodes comprising two electrodes;
a discharge tube;
a rear mirror; and
an output mirror;
wherein:
the two electrodes are symmetrically disposed in parallel at an outer layer of the discharge tube; the two electrodes are connected to a radio-frequency power supply via a matching network, and are configured to perform radio-frequency discharge on working gas in the discharge tube;

the rear mirror and the output mirror are disposed at two end surfaces of the discharge tube, respectively; the rear mirror, the output mirror, and the discharge tube form a resonant cavity; the output mirror is configured to output a laser beam;

an outer wall of the discharge tube in the vicinity of the optical beam-shaping system is coated with a transmission film; the transmission film is conformity to pump light in size and shape; the rest of the outer wall is coated with a reflection film, and an inner wall of the discharge tube is uncoated, or coated with another transmission film; the discharge tube is filled with the working gas; and the working gas is rare gas, or a mixture of rare gas and assistant gas;

the semiconductor laser is configured to produce pump light the optical beam-shaping system is configured to concentrate the pump light to form a narrow strip facula; the facula is allowed to pass through the transmission film on the outer wall of the discharge tube and is injected in the discharge tube; and a central wavelength of the pump light matches with an absorption line of gas particles produced by the radio-frequency discharge of the working gas in the discharge tube; and a water-cooling channel is disposed in the pair of electrodes.

10. A gas laser, comprising:
a semiconductor laser;
an optical beam-shaping system;
a pair of electrodes comprising two electrodes;
a discharge tube;
a rear mirror; and
an output mirror;
wherein
the two electrodes are symmetrically disposed in parallel at an outer layer of the discharge tube; the two electrodes are connected to a radio-frequency power supply via a matching network, and are configured to perform radio-frequency discharge on working gas in the discharge tube;

the rear mirror and the output mirror are disposed at two end surfaces of the discharge tube, respectively; the rear mirror, the output mirror, and the discharge tube form a resonant cavity; the output mirror is configured to output a laser beam;

an outer wall of the discharge tube in the vicinity of the optical beam-shaping system is coated with a transmission film; the transmission film is conformity to pump light in size and shape; the rest of the outer wall is coated with a reflection film, and an inner wall of the discharge tube is uncoated, or coated with another transmission film; the discharge tube is filled with the working gas; and the working gas is rare gas, or a mixture of rare gas and assistant gas;

the semiconductor laser is configured to produce pump light the optical beam-shaping system is configured to concentrate the pump light to form a narrow strip facula; the facula is allowed to pass through the transmission film on the outer wall of the discharge tube and is injected in the discharge tube; and a central wavelength of the pump light matches with an absorption line of gas particles produced by the radio-frequency discharge of the working gas in the discharge tube; and a shielding chamber is disposed at an outer side of the pair of electrodes; the shielding chamber is made of metal materials; the shielding chamber is filled with gas with ionization potential, or the shielding chamber is vacuumed; and the shielding chamber is provided with a shielding chamber window at a position relative to the semiconductor laser, and the shielding chamber window allows the pump light to transmit.

11. The laser of claim 10, wherein a gas inlet and a gas outlet are disposed in the discharge tube; and an external pipeline between the gas inlet and the gas outlet is connected to a fan and a heat exchanger in series.

12. The laser of claim 10, wherein a plurality of the discharge tubes is connected in series in the shielding chamber; and pairs of the electrodes on the outer wall of adjacent discharge tubes are mutually perpendicular.

13. A gas laser, comprising:
a semiconductor laser;
an optical beam-shaping system;
a pair of electrodes comprising two electrodes;
a discharge tube;
a rear mirror; and
an output mirror;
wherein
the two electrodes are symmetrically disposed in parallel at an outer layer of the discharge tube; the two electrodes are connected to a radio-frequency power supply via a matching network, and are configured to perform radio-frequency discharge on working gas in the discharge tube;

the rear mirror and the output mirror are disposed at two end surfaces of the discharge tube, respectively; the rear mirror, the output mirror, and the discharge tube form a resonant cavity; the output mirror is configured to output a laser beam;

an outer wall of the discharge tube in the vicinity of the optical beam-shaping system is coated with a transmission film; the transmission film is conformity to pump light in size and shape; the rest of the outer wall is coated with a reflection film, and an inner wall of the discharge tube is uncoated, or coated with another transmission film; the discharge tube is filled with the working gas; and the working gas is rare gas, or a mixture of rare gas and assistant gas;

the semiconductor laser is configured to produce pump light the optical beam-shaping system is configured to concentrate the pump light to form a narrow strip facula; the facula is allowed to pass through the transmission film on the outer wall of the discharge tube and is injected in the discharge tube; and a central wavelength of the pump light matches with an absorption line of gas particles produced by the radio-frequency discharge of the working gas in the discharge tube; and a gas inlet and a gas outlet are disposed in the discharge tube; and an external pipeline between the gas inlet and the gas outlet is connected to a fan and a heat exchanger in series.

* * * * *